(12) United States Patent
Lenz

(10) Patent No.: US 8,303,221 B2
(45) Date of Patent: Nov. 6, 2012

(54) DEVICE FOR AND METHOD OF SECURING ITEMS IN A CARGO BED

(76) Inventor: Arthur W. Lenz, Papillion, NE (US)

( * ) Notice: Subject to any disclaimer, the term of this patent is extended or adjusted under 35 U.S.C. 154(b) by 664 days.

(21) Appl. No.: 12/074,793

(22) Filed: Mar. 6, 2008

(65) Prior Publication Data

US 2009/0226276 A1  Sep. 10, 2009

(51) Int. Cl.
*B60P 7/08* (2006.01)

(52) U.S. Cl. ........ 410/140; 410/121; 410/129; 410/141; 410/149

(58) Field of Classification Search ............ 410/94, 410/95, 101, 106, 121, 129, 140, 141, 142, 410/149, 153; 224/402–404, 42.33; 296/24.4, 296/182.1, 37.6, 39.2; 220/552, 529
See application file for complete search history.

(56) References Cited

U.S. PATENT DOCUMENTS

| 5,599,055 | A | * | 2/1997 | Brown |
| 5,829,655 | A | * | 11/1998 | Salopek |
| 6,089,804 | A | * | 7/2000 | Bartelt ........................ 410/140 |
| 6,648,569 | B2 | * | 11/2003 | Douglass et al. ............. 410/46 |

* cited by examiner

*Primary Examiner* — Stephen Gordon
(74) *Attorney, Agent, or Firm* — Philip J. Lee

(57) ABSTRACT

An assembly of a number of perforated sheets with fasteners and braces to temporarily and adjustably provide variable partitions and means for securing items within the cargo bed of a truck or trailer, uses a set of flat rectangular sheets that are perforated by an array of regularly spaced holes to accept connectors and bolts to secure braces or fixtures to the sheets in a variety of configurations including at least a base sheet sized to fit horizontally on the cargo bed and/or vertical partition sheets with sockets along the long edges, spaced the same as the sheet holes and secured to the base sheet by pegs and braces and fixtures such as rings, adjustable length bars or hooks are usefully attachable to the sheets by bolts or by pegs inserted into the holes.

14 Claims, 6 Drawing Sheets

Fig. 8　Fig. 9　Fig. 10　Fig. 11
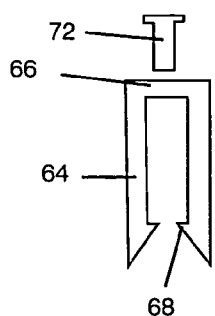
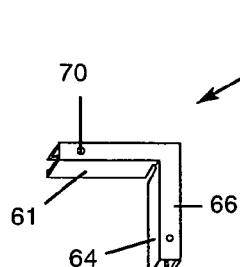
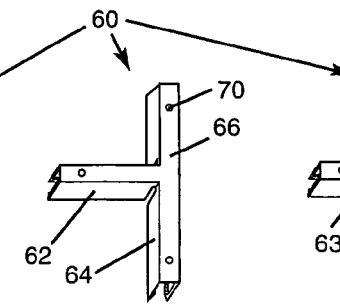
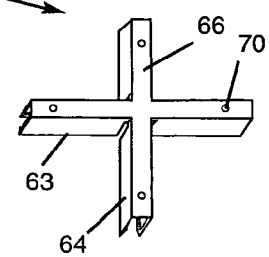
Fig. 12
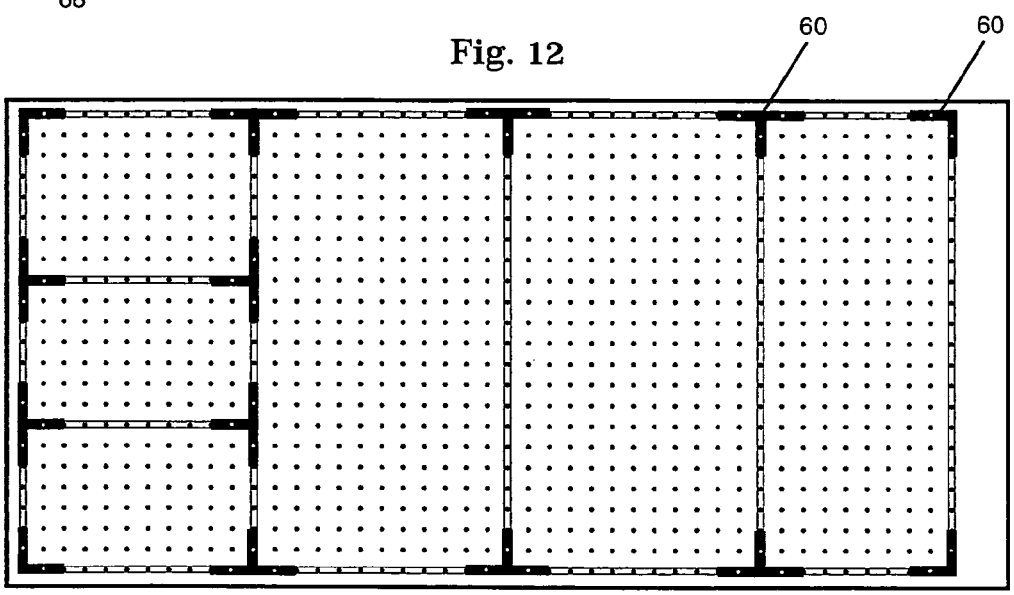
Fig. 13
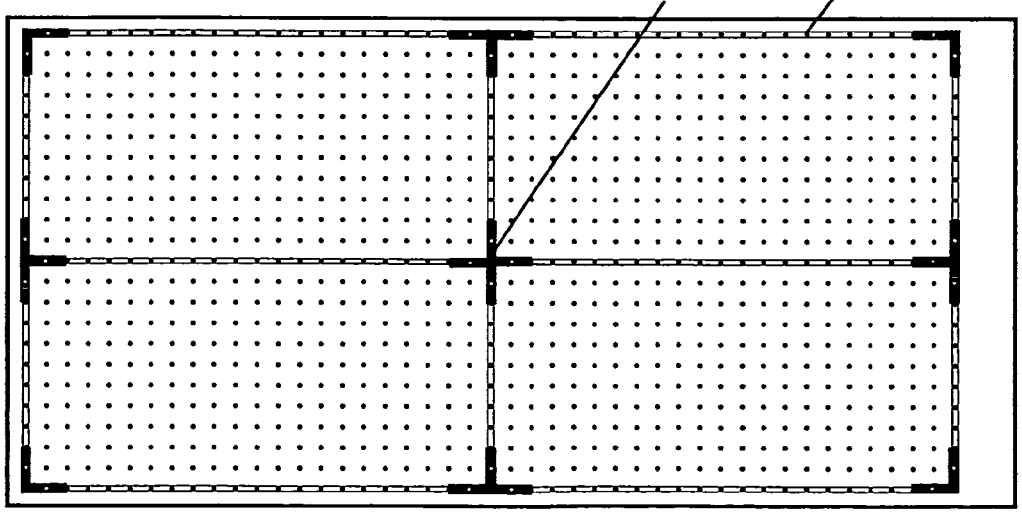

Fig. 14
Fig. 15
Fig. 16
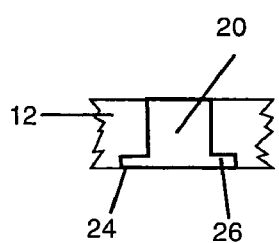
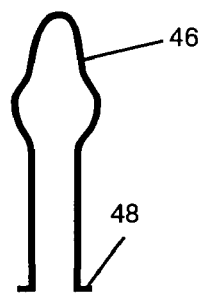
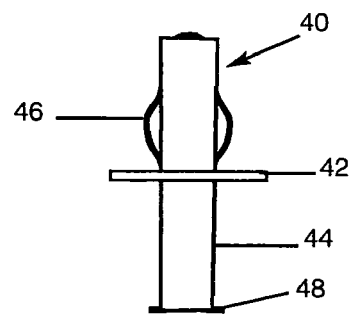
Fig. 17
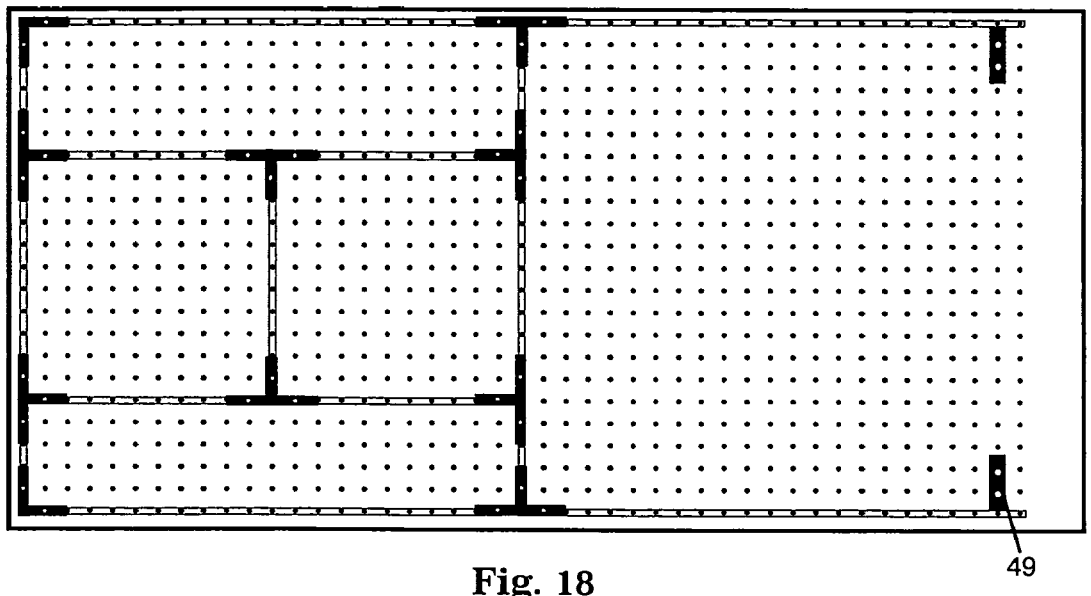
Fig. 18
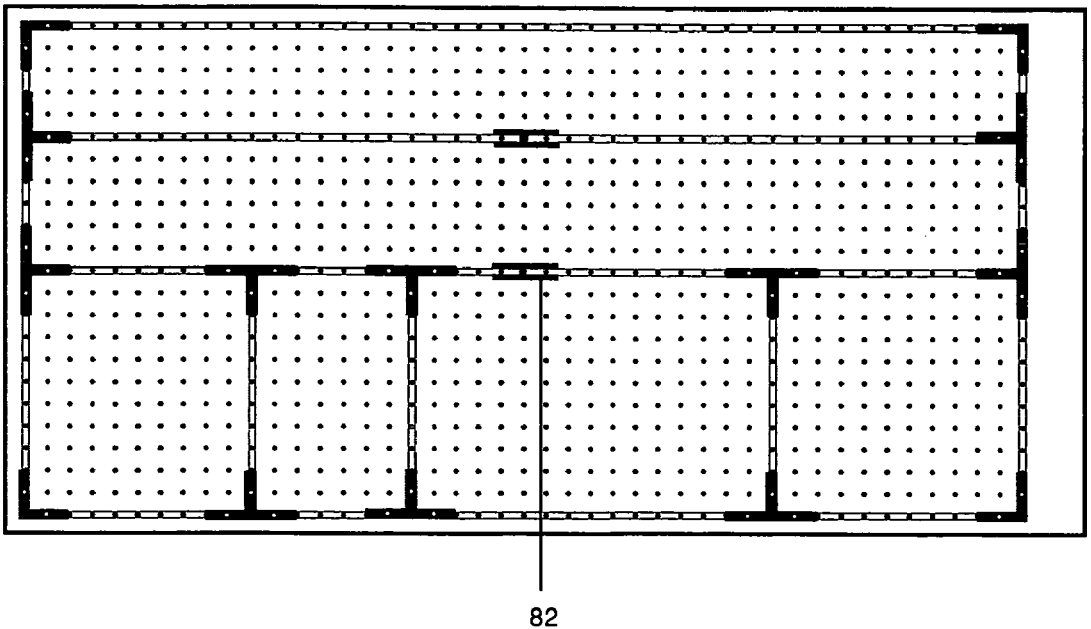

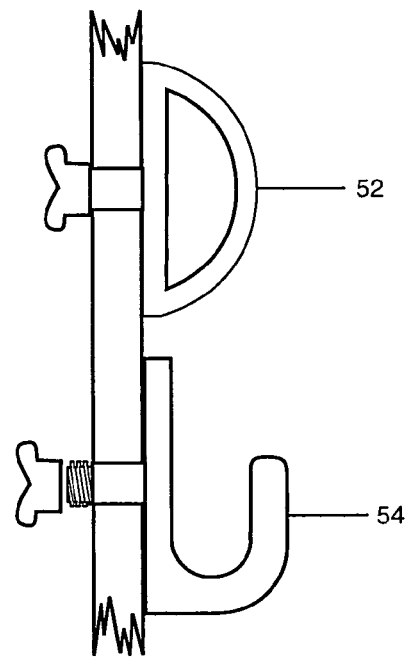
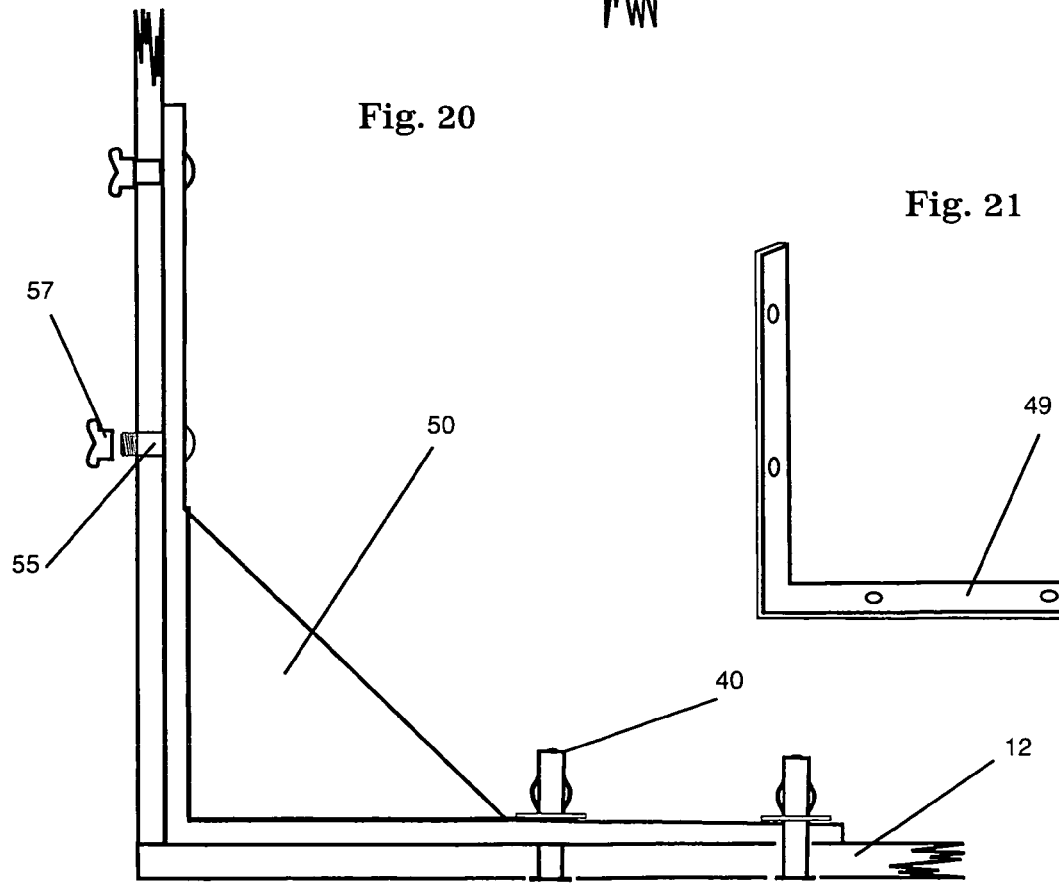
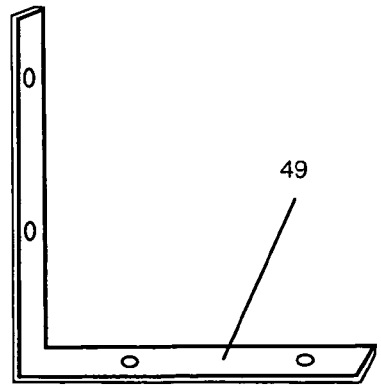

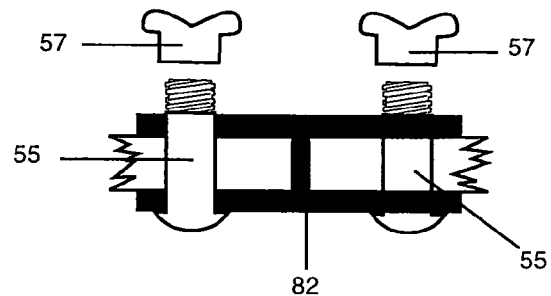
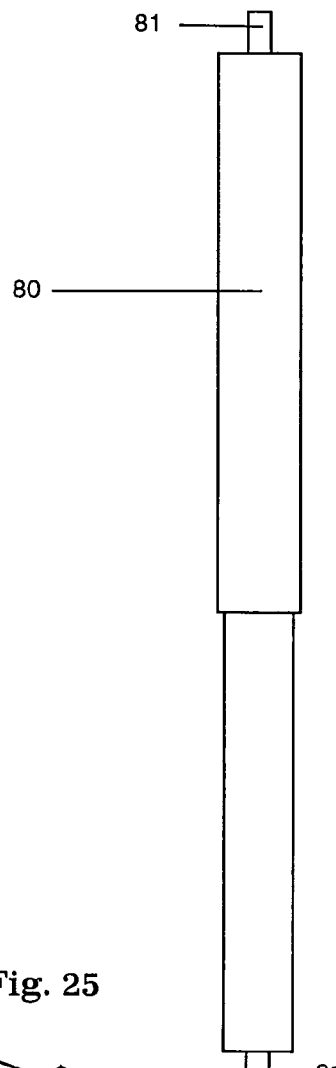
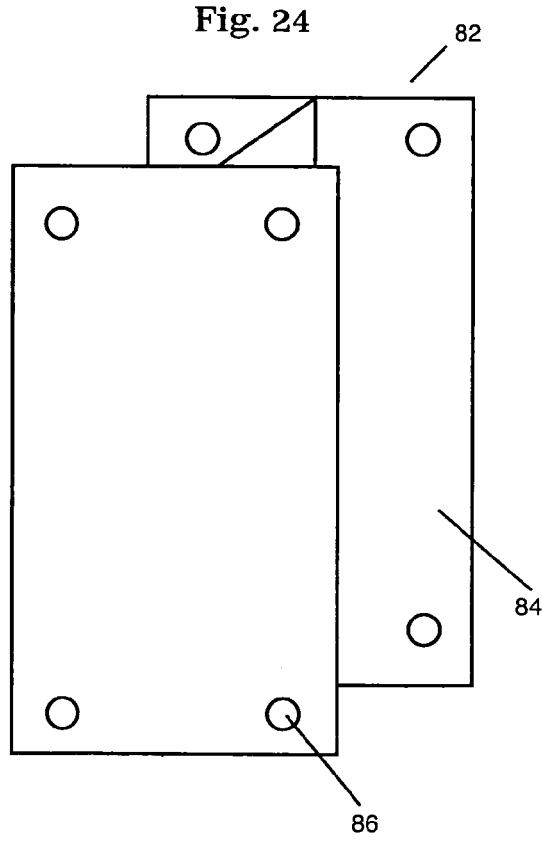
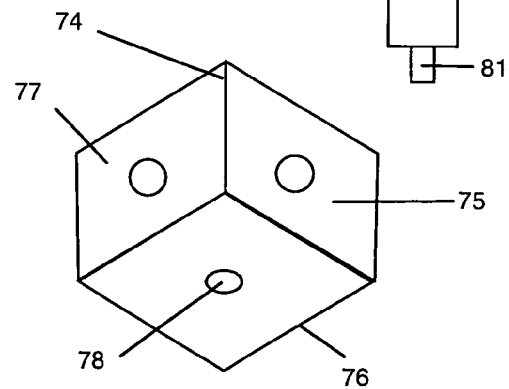

DEVICE FOR AND METHOD OF SECURING ITEMS IN A CARGO BED

BACKGROUND OF THE INVENTION

A. Field of Invention

The present invention relates generally to devices used in securing items in a cargo bed and methods for doing so, and more particularly to a new and improved device and method for securing items in the cargo bed of a truck or trailer.

B. Description of Related art

Conventional trucks and trailers feature an open cargo bed that is accessible from the top and/or through a tail gate or door at the rear of the cargo bed, and which extends from the back of the cab to the tail gate. Frequently the floor of the cargo bed is formed with ridges extending from front to back to increase strength of the floor, and the floor is usually uninterrupted from the front to the rear for the purpose of facilitating loading by sliding items into the cargo bed from the rear, through the tail gate. Items also may be loaded into the cargo bed from the top and may be of any size that can fit within the bed. Certain load items tend to slide in a cargo bed due to inertia when the truck or trailer is in motion, which can be an inconvenience and at times dangerous. Neither the cargo bed floor or sides provide a convenient means for easily securing the position of items loaded in the cargo bed when such items are not of sufficient size to be securely held in place by the walls and/or tail gate. Conventional means for securing such smaller items involve installation of permanent partitions, which limit the subsequent loading of larger or differently shaped items. Alternatively, items may be temporarily lashed in place by means of rope or webbing secured to eyelets or other fittings on the perimeter of the cargo bed, a method that can be unreliable and dependent on the skill of the user.

It would therefore be desirable to provide a device for reliably and safely securing items of varying sizes, weights or shapes within a cargo bed, while being easily adjustable and/or removable to allow loading differently sized items at different times, as desired.

SUMMARY OF THE INVENTION

The device of the present invention comprises an assembly of a number of perforated sheets with fasteners to temporarily and adjustably provide variable partitions and means for securing items within the cargo bed of a truck or trailer. The assembly comprises a set of perforated sheets of rigid or semi-rigid material, for example, plywood, plastic, metal or composite material possibly including a rubber component and a variety of fasteners and braces specifically designed for use in the invention. The sheets are rectangular and perforated by 0.5 inch diameter holes. All dimensions referenced herein are intended as examples and not as limitations with the exception that modifications to one dimension may require modification of other dimensions as well.

A base sheet is generally sized to fit in the cargo bed and lay flat on the floor of the bed without extra space around the perimeter of the sheet, which is held in place by the walls of the cargo bed. For example, base sheets for use in pickup trucks would be expected to be rectangular with a four foot width and a length of either eight or six feet. Tying cords at each corner secure the base sheet within the cargo bed. One-half inch diameter holes are drilled or otherwise formed in a rectangular array of rows and columns with the holes spaced 2 inches apart measured from the center of one hole to the center of the next, when seen in a row or column.

The base sheet holes are ½ inch in diameter from the top side and an area of increased diameter surrounds the one end of the holes, creating an annular shoulder. When installed as intended, laying flat on the floor of a cargo bed, the base sheet is installed so that the shoulder end of each hole is on the bottom adjacent to the floor of the cargo bed.

The assembly may also include vertical sidewall sheets formed of similar material to the base sheet and having similarly spaced holes. Sidewall sheets sized for use in pick up trucks are beneficially about 8 or about 6 feet in length and about 15 inches in height with an array of similarly spaced ½ inch holes, spaced 2 inches apart. The 8 foot long sidewall sheets have 7 rows of 43 holes and the 6 foot long sidewall sheets have 7 rows of 32 holes. In addition, each sidewall sheet has one longitudinal edge with outwardly projecting pegs that are ½ inch in diameter and spaced to align and coincide with the spacing of the base sheet holes. The peg containing edge is intended to be used with the pegs engaged with the base sheet and is therefore the bottom edge. Both the top and bottom edges have blind sockets in the same plane as the sheet and spaced two inches, center to center to coincide with the base sheet holes. The pegs are partially inserted into the bottom edge sockets and the top edge sockets provide means for securing braces as described below. The top edge of the sidewall sheets opposes the bottom edge and is formed with a shallow groove on each side, extending the length of the edge and parallel to the edge. The groove is relatively small and leaves enough material between the grooves to provide adequate strength to the top of the sidewall sheet. In addition to the sidewall sheets, partition sheets are also provided in shorter sizes, frequently either about 2 or about 4 foot long lengths and are of similar configuration as the sidewall sheets. The partition sheets have similarly spaced holes and pegs along the bottom edge and grooves along the top edge. The nominally 4 foot long partition sheet is used as a crosspiece and is sized to extend from one sidewall sheet to the other. When used as a crosspiece, the nominally four foot partition sheets are fastened to the sidewall sheets and provide bracing and support to the sidewall sheets. Alternately, the nominally four foot partition sheets can be joined end to end and installed lengthwise, parallel and between the sidewall sheets. The nominally two foot partition sheets can be installed and used in a variety of configurations, joined to each other, other partitions or to sidewall sheets, generally either parallel or at a right angle to the sidewall sheets.

Included with the base, sidewall, and partition sheets are braces and connecting hardware used to connect the sheets. Base sheet connectors consist of a generally cylindrical shaft with a central washer welded perpendicular and around the shaft. A wire spring is contained within the shaft and retractably biases two outward prongs at the bottom of the connector to retractably extend past the perimeter of the connector shaft. When the prongs are retracted, the connector shaft can be inserted into a hole until the prongs are adjacent to the bottom of the hole. When the connector is fully inserted, the prongs can be released and their outward extension is received within the shoulder area of the bottom of the hole. The outward extension of the prongs prevents the removal of the connector from the hole unless the prongs are retracted. The base sheet connectors are used to secure braces to the base sheet and the braces are used to secure and support the sidewall and partition sheets, or to provide tiedown anchors for securing items to the base sheet. Normal bolts are used to secure braces or tie down brackets to the sidewall sheets and partition sheets. The system also includes top corner or intersection braces that are formed as a right angle or cross with a clamp section formed of two opposing metal sheets extending downward and generally parallel to each other with inwardly projecting barbs or ridges that face each other and when the brace is installed, project into the grooves in the upper edge of the sidewall or partition sheets. Pegs extend downward from the inside top of the braces to be inserted into the top edge sockets when the top brace is installed. Inside corner braces are provided with three faces at right angles to each other to fit within and support an inside corner formed between a horizontal base sheet and two vertical partition sheets that are at a right angle to each other. Right angle braces are used to attach and support the partition and sidewall sheets to the base sheet. Finally, a telescoping or adjustable bar with pegs at each end sized to fit within the sidewall and partition sheets is sized to retractably extend between the sidewall sheets or partition sheets to provide lateral support for the sheets and/or cargo, and/or a useful rack or tie down point.

The method of the present invention comprises the construction, installation and use of an assembly of the described components to provide a method of securing items within a cargo bed. The assembly may be assembled in a number of configurations, using the appropriate connectors, bolts, braces, and/or pegs to fasten and support sidewall sheets and partition sheets to a base sheet. A base sheet can be used by itself with the base sheet connectors being useful to provide tie down anchor points themselves or to fasten separate anchor fittings. The base sheet is installed by placing it in the cargo bed of a truck and using corner ties and the sides of the bed to secure the base sheet. It is anticipated that use of a partition sheet across the end of the base sheet nearest the truck cab between two sidewall sheets along the side edges of the base sheet will be desirable and useful configuration with inside corner braces securing the junctions of partition, base, and adjacent sidewall sheets and top corner braces securing the top edges of the adjacent partition and sidewall sheets. Additional partition sheets may be beneficially installed between the sidewall sheets and/or between transverse partition sheets, with top corner braces, inside corner braces and base sheet brackets used to secure the sheets relative to each other. All vertical sheets are to be installed with the peg edge downward toward and contacting the base sheet with the pegs inserted into the base sheet holes in the desired row or column.

The principle aim of the present invention is to provide a new and improved device that meets the foregoing requirements and is convenient and safe to assemble, install and use in multiple configurations.

Other objects and advantages of the invention will become apparent from the Description of the Preferred Embodiments and the Drawings and will be in part pointed out in more detail hereinafter.

The invention consists in the features of construction, combination of elements and arrangement of parts exemplified in the construction hereinafter described and the scope of the invention will be indicated in the appended claims.

BRIEF DESCRIPTION OF THE DRAWINGS

FIG. 8 is a side sectional view of a top brace and pin of a device according to the present invention.

FIG. 9 is a top perspective view of a right angle top brace of a device according to the present invention.

FIG. 10 is a top perspective view of a tee top brace of a device according to the present invention FIG. 11 is a top perspective view of a cross top brace of a device according to the present invention FIG. 12 is a top view of one configuration of an assembled device in accord with the present invention.

FIG. 13 is a top view of a second configuration of an assembled device in accord with the present invention.

FIG. 14 is a partial cross sectional view through a base sheet hole of a device in accord with the present invention.

FIG. 15 is a side view of a base sheet connector spring of a device in accord with the present invention.

FIG. 16 is a side perspective view of a base sheet connector of a device in accord with the present invention.

FIG. 17 is a top view of a third configuration of an assembled device in accord with the present invention.

FIG. 18 is a top view of a fourth configuration of an assembled device in accord with the present invention.

FIG. 19 is a sectional side view of an installation of a ring and a hook fixture on a partial partition sheet device in accord with the present invention.

FIG. 20 is a sectional side view of an installation of a right angle brace between a base sheet and a partition sheet device in accord with the present invention.

FIG. 21 is a side view of a right angle brace of a device in accord with the present invention.

FIG. 22 is a side perspective view of a telescoping pole of a device in accord with the present invention.

FIG. 23 is a top sectional view of a butt brace connecting two partial partition sheets of a device in accord with the present invention.

FIG. 24 is a perspective view of a butt brace of a device in accord with the present invention.

FIG. 25 is a perspective view of an inside corner brace of a device in accord with the present invention.

DESCRIPTION OF THE PREFERRED EMBODIMENT(S)

Figure 1:
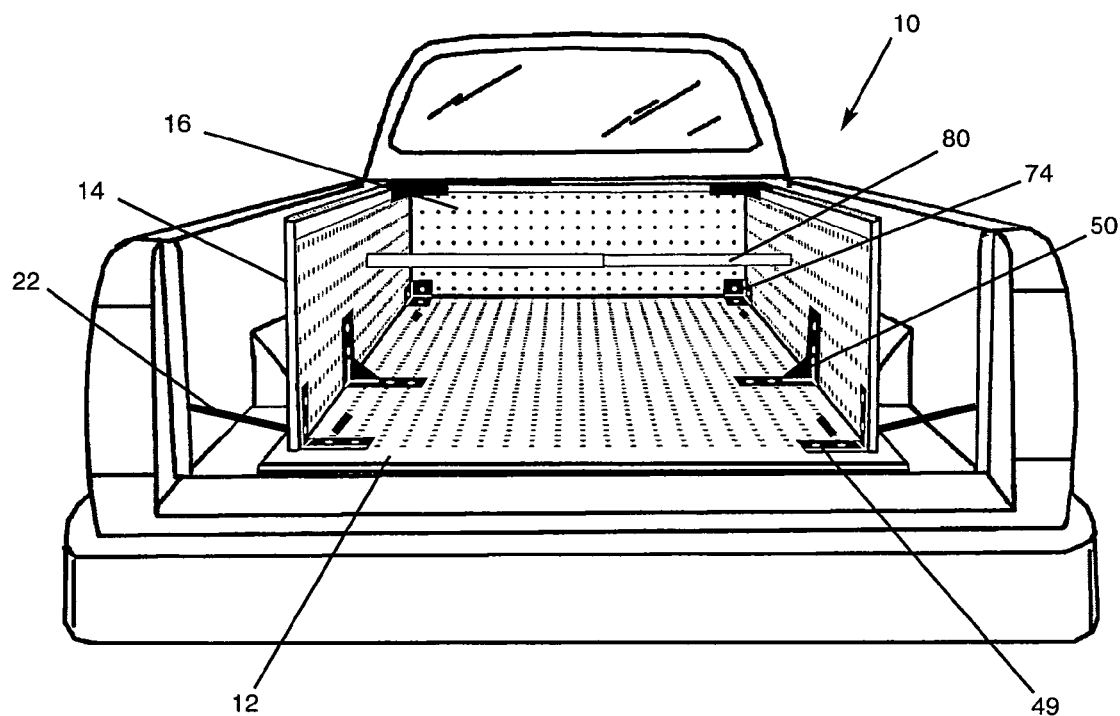
FIG. 1 is a rear view of an assembled device according to the present invention installed in the cargo bed of a pickup truck.
Figure 2:
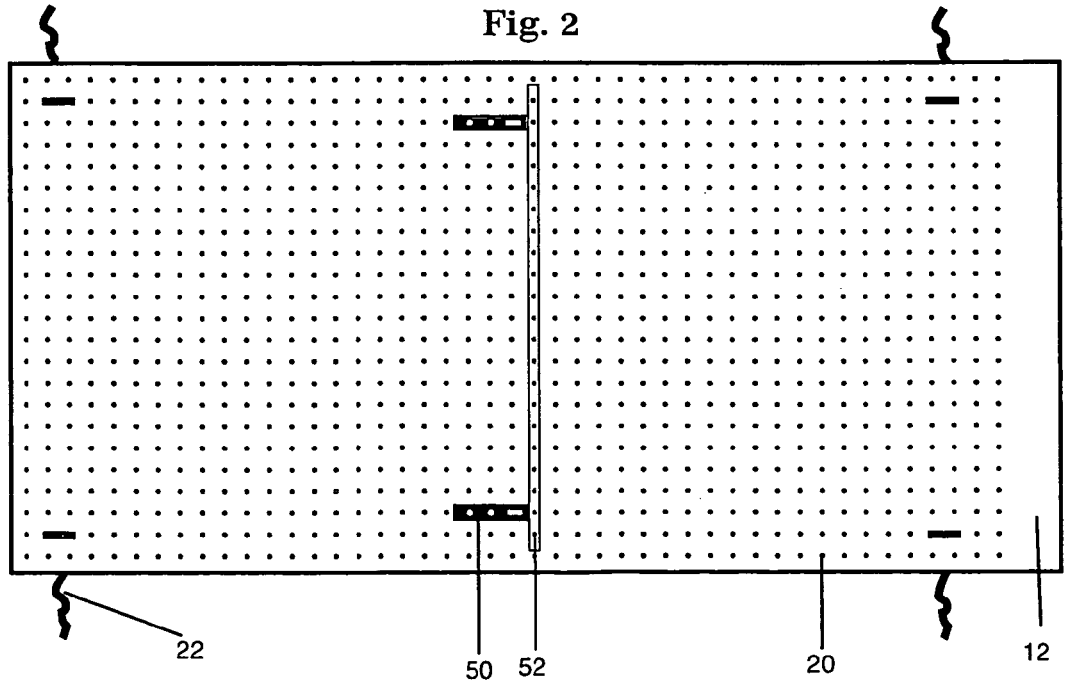
FIG. 2 is a top view of the base sheet of a device according to the present invention with a cross piece installed thereon.
Figure 3:
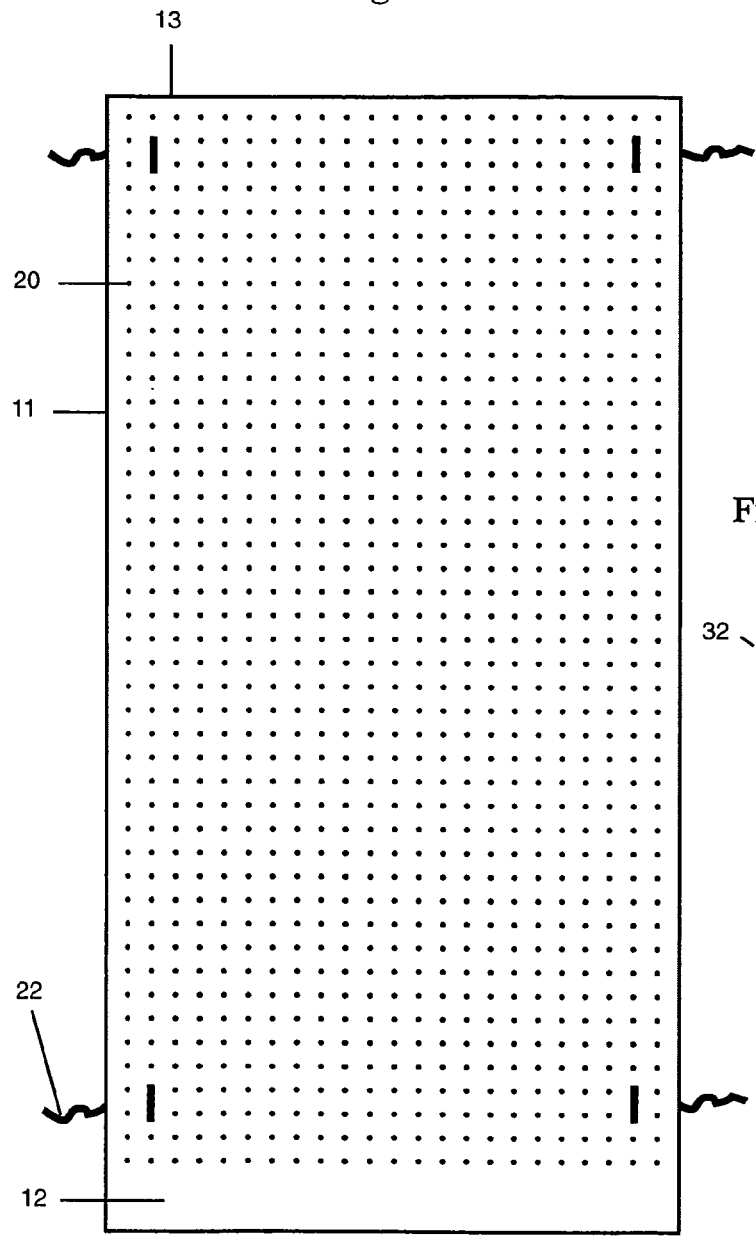
FIG. 3 is a top view of base sheet of a device according to the present invention.
Figure 4:
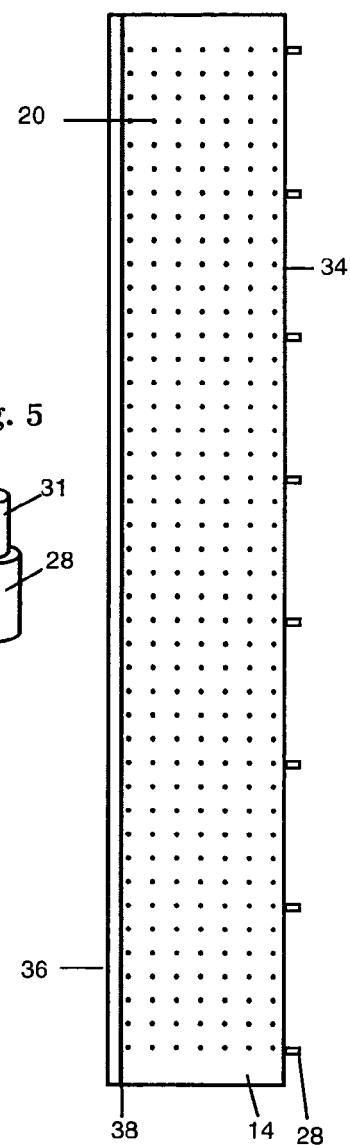
FIG. 4 is a side view of a long partition sheet of a device according to the present invention.
Figure 5:
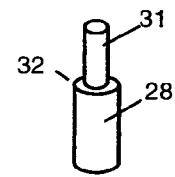
FIG. 5 is a perspective view of a peg of a device according to the present invention.
Figure 6:
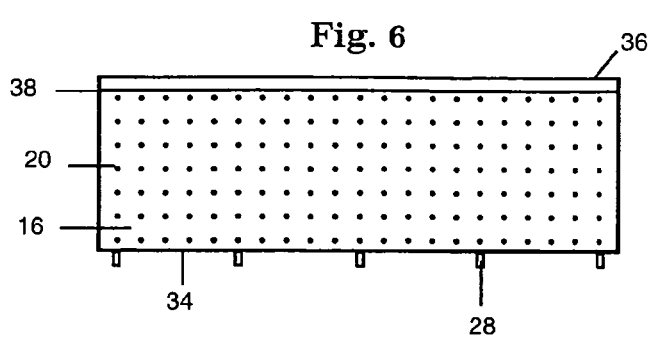
FIG. 6 is a side view of a medium length partition sheet of a device according to the present invention.
Figure 7:
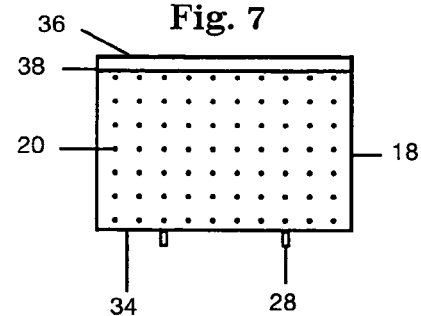
FIG. 7 is a side view of a short partition sheet of a device according to the present invention.

With reference to the Drawings wherein like numerals represent like parts throughout the Figures, an assembly of the present invention for securing items in the cargo bed of a truck is generally designated by numeral 10 in FIGS. 1, 2, 4 and 5. All dimensions referenced herein are intended as examples and not as limitations with the exception that modifications to one dimension may require modification of other dimensions as well. For ease of description and to provide an example of one use of the invention, sizes of the sheets described herein are in accord with common sizes of pick up trucks in view of the popularity of such trucks, and can readily be modified for use in other sized cargo beds, whether in trucks or trailers.

The present invention comprises an assembly 10 of a base sheet 12 and a number of partition sheets 14, 16, and 18 of rigid or semi-rigid material, for example, plywood, plastic, metal or composite material possibly including a rubber component and a variety of fasteners, braces and attachments specifically designed for use in the invention. The base sheet 12 and all partition sheets 14, 16, and 18 are rectangular and perforated by 0.5 inch diameter holes 20 that are drilled or otherwise formed in a rectangular array of rows and columns with holes 20 spaced 2 inches apart measured from the center of one hole 20 to the center of the next, when seen in a row or column. Base sheet 12 is generally sized to fit in a cargo bed and lay flat on the floor of the bed without extra space around the perimeter of the sheet, which is held in place by the walls of the cargo bed. Base sheet 12 comprises long sides 11 and shorter sides 13 and in the preferred embodiment described herein can be either 4 feet wide and 8 feet long or 4 feet wide and 6 feet long and about ⅝ inches thick, since pick up truck cargo beds are often either six foot long or eight foot long. Base sheet material can be cut to fit any size cargo bed. The larger version of base sheet 12 is intended for full sized pickup truck beds and has 23 columns of 45 holes commencing 2 inches from the edges of the sheet. This array pattern is similar in the shorter sheet with proportionately fewer holes in a 23×34 hole array. Tying cords 22 are fastened through holes 20 at each corner of base sheet 12 and are used to secure base sheet 12 and whatever is attached thereto within the truck bed. Base sheet holes 20 are formed with a 0.5 inch general diameter and an area of increased diameter 24 surrounds the end of holes 20 that is to be on the bottom against the cargo bed floor when installed as intended in a truck, thus creating an annular shoulder 26 at the bottom of holes 20.

Assembly 10 includes rectangular partition sheets 14, 16, and 18 formed of similar material to base sheet 12 and having 0.5 inch diameter holes 20, similarly spaced two inches apart center to center as in base sheet 12. Partition sheets 14, 16, and 18 are similar in construction but are of different lengths, sheet 14 being relatively long, sheet 18 being relatively short and sheet 16 being medium in length. Both long edges of partition sheets 14, 16, and 18 (designated by numeral 34 for the bottom edge and 36 for the top edge) are formed with blind socket holes 52 drilled at two inch spacing along the edge in the plane of the sheet and about 0.375 inches in diameter or less. Each partition sheet 14, 16, or 18 has one longitudinal edge 34 with outwardly projecting pegs 28 that are inserted in the edge holes 52 and thus spaced to align and coincide with the spacing of the base sheet holes 20, in spacings of two inches center to center or multiples thereof. Pegs 28 are formed rods having a ½ inch in diameter section 32 that projects from sheet edge 34 and a reduced diameter section 31 that is inserted into holes 52 formed in partition sheet edge 34. The peg containing edge 34 is intended to be used with the larger peg section 32 inserted into the base sheet holes 20 and is therefore the bottom edge. The top edge 36 of the sidewall sheets 14, 16, and 18 opposes the bottom edge and is formed with a shallow groove 38 on each side, extending the length of and parallel to edge 36. Groove 38 is relatively shallow and leaves enough material of the partition sheet to provide adequate strength to the top of the partition sheet 14, 16, or 18. The partition sheets 14, 16, and 18 comprise sidewall sheets 14 that are less than the same length as the base sheet 12 with which they are to be assembled, beneficially about 8 or 6 feet in length and are generally as wide as the height of the cargo bed wall within which it is to be installed, often 15 inches in height. The height of the vertical partition sheets may vary according to the user's preference. A nominally eight foot long sidewall sheet 14 is nearly eight feet in length and has 7 rows of 43 holes and a nominally six foot long sidewall sheet 14 is nearly six feet in length and has 7 rows of 32 holes. Sidewall sheets 14 are intended to be assembled with one sidewall sheet 14 along each base sheet side edge 11. Shorter partition sheets 18 are provided in nearly two foot long lengths and are of similar configuration as the sidewall sheets 14 with similarly spaced holes 20 and pegs 28 along the bottom edge 34 and grooves 38 along the top edge 36. A nearly four foot long medium partition sheet 16 is used as a transverse crosspiece and is sized to extend from one sidewall sheet 14 to the other. When used as a crosspiece, transverse partition sheets 16 are fastened to the sidewall sheets 14 and provide bracing and support to the sidewall sheets 14.

The assembly includes base sheet connectors 40 consisting of a generally cylindrical shaft 44 with a central washer 42 welded perpendicular to and around shaft 44. A wire spring 46 is generally contained within shaft 44 and comprises two outwardly projecting and retractable prongs 48 at the bottom of connector shaft 44 to retractably extend past the perimeter of connector shaft 44. When prongs 48 are retracted, the connector shaft 44 can be inserted into a base sheet hole 20 until washer 42 contacts the upper surface of base sheet 12 surrounding the hole 20 When the connector 40 is fully inserted, the prongs 48 can be released and their outward extension is received within the expanded area 24 of the bottom of the hole 20. The outward extension of the prongs 48 engages hole shoulder 26 and prevents the removal of the connector from hole 20 unless prongs 48 are retracted. When assembled as described no part of base sheet connector 40 will protrude beyond and below the bottom surface of base sheet 12. The base sheet connectors 40 are used to secure angle braces 50 to the base sheet 12 to secure and support the sidewall 14 and/or partition sheets 16 or 18, or to provide or connect tiedown anchors such as rings or hooks for securing items to the base sheet 12. Normal bolts 55 with wing nuts 57 are used to secure braces 50 or other fixtures to the sidewall sheets 14 and partition sheets 16 or 18. The assembly 10 also includes top corner or intersection braces 60 that are formed as a right angle 61, tee 62 or cross 63 with a clamp section formed of two opposing metal sides 64 extending downward from a flat top section 66 that is more than two inches long and as wide as necessary to receive partition sheet edge 36. Top brace sides 64 are generally flat and parallel to each other with inwardly projecting barbs or ridges 68 that face each other and when the brace is installed, project into the grooves 38 in the upper edge 36 of the sidewall or partition sheets. The lower edge 69 of top brace sides 64 are chamfered to aid installation during which the top partition edge 36 is inserted between the brace sides 64. Top section 66 includes at least one hole 70 for each of the partition sheets to be attached to the top brace 60 and holes 70 are spaced to align with the holes 52 in the top edge 36 of a partition sheet inserted into the brace 60. Top brace pins 72 are provided for insertion through top brace holes 70 and into partition sheet holes 52 to secure the top brace 60 in place relative to the partition sheets connected by the top brace 60. Inside corner braces 74 are provided with three faces 75, 76, and 77 at right angles to each other to fit within and support an inside corner formed between a horizontal base sheet 12 and two vertical partition sheets 14, 16, or 18 that are at a right angle to each other. A hole 78 is formed in each face 75, 76, and 77 of inside corner brace 74 and spaced to align with a hole 20 in each of the sheets being connected and supported. In the event two partition sheets 16 or 18 are to be joined in a coplanar configuration, a partition butt brace 82 is included in the assembly 10. Butt brace 82 comprises two opposing and parallel flat sides 84 separated by the thickness of the partition sheets 16 or 18 to be joined and form holes 86 spaced to align with holes 20 in the partition sheets 16 or 18 to be joined as shown in FIG. 23. An adjustable length or telescoping bar 80 retractably extends between the sidewall sheets 14 or partition sheets 16 or 18 to provide lateral support. Bar 80 comprises a peg 81 at each end, sized to fit into the partition sheet holes 20 and is expansively biased against opposing sheets by spring or other means (not shown).

The method of the present invention comprises forming the components of assembly 10, assembling the desired components, installing and using the resulting assembly 10 to secure items within a cargo bed. The components may be assembled in a number of configurations, using the appropriate connectors 40, bolts 55, pegs 28 and braces 50 and/or 74 to fasten and support selected partition sheets 14, 16, and/or 18 to a base sheet 12 and using top braces 60, angle braces 50 and/or butt braces 84 to fasten the partition sheets to each other. Telescoping bar 80 can be used between partition sheets to provide lateral support for the sheets and an easily removable cargo restraint. FIGS. 1, 2, 12, 13, 17 and 18 illustrate a total of 6 different useful configurations of assembly 10 and are meant as exemplars and not as limitations to the method or the assembly 10.

A base sheet 12 can be used by itself with the base sheet connectors 40 being useful as tying points or to fasten separate anchor fittings such as rings 52 or hooks 54. Base sheet 12 is installed by placing it in the cargo bed of a truck or trailer and using corner ties 22 and the sides of the bed to secure base sheet 12 within the bed. It is anticipated that use of at least one partition sheet 16 or a telescoping bar 80 may be used to provide lateral support of the sidewall sheets 14 when the sheets 14 are used. Installation of a partition sheet 16 across either the end of the base sheet 12 nearest the truck cab or the tail gate end or both, between two sidewall sheets 14 installed along the long side edges 111 of the base sheet 12 will be a desirable and useful configuration with inside corner braces 74 securing the junctions of partition, base, and adjacent sidewall sheets and top corner braces 60 securing the top edges of the adjacent partition sheets and sidewall sheets 14 and 16. Additional partition sheets may be beneficially installed between the sidewall sheets 14 and/or between transverse partition sheets 16, with top corner braces 60, inside corner braces 74 and angle braces 50 used to secure the sheets relative to each other. All partition sheets 14, 16, or 18 are to be installed with the peg edge 34 downward toward and contacting the base sheet 12 with the pegs 28 inserted into the base sheet holes 20 in the desired row or column. Rings 52 or hooks 54 can be placed as desired on either partition sheets 14, 16, or 18, or base sheet 12. In a truck or trailer cargo bed having sidewalls, sidewall sheets 14 can be used without attachment to a base sheet 12 provided that either a transversely positioned partition sheet or telescoping bar 80 is used to provide lateral support and cargo restraint. The height of partition sheets 14, 16, and 18 can be increased or decreased as may be advantageous, particularly when used in cargo beds with sidewalls of different heights. In longer cargo beds, multiple sidewall or base sheets can be joined together if desired.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention. It is specifically anticipated that a variety of materials could be suitable for use in constructing device 10 without departing from the spirit of this invention. It is further anticipated that other uses and combinations of some or all of the components of assembly 10 will be found to be useful.

What is claimed is:

1. An assembly for providing means to secure items within a cargo bed having a floor, a front end and a rear end, the assembly comprising
   a base sheet sized to fit within the cargo bed, horizontally on the floor thereof and being generally rectangular with two mutually parallel side edges of equal length and two mutually parallel edges of equal length, constituting a front edge and a rear edge, the base sheet comprising a plurality of round perforations formed normal to a surface of the base sheet and in an array of rows and columns, the rows being generally parallel to the side edges and the columns being generally parallel to the front and rear edges, the perforations in said array being uniformly spaced a predetermined distance within each row and uniformly spaced the same distance within each column, and
   means to tie the base sheet to the cargo bed, and
   at least one vertical sheet, being generally flat and rectangular with two flat parallel side surfaces separated by a thickness and with four straight edges with a width the same as the sheet thickness, comprising mutually parallel top and bottom edges and two mutually parallel side edges, and having a plurality of round peg holes formed in at least the bottom edge, the peg holes being normal to a surface of the bottom edge, parallel to a plane of the vertical sheet and spaced the same predetermined distance apart as the spacing of the base sheet perforations within each row and column, and
   the assembly further comprising a plurality of round straight pegs each of which is formed and assembled with a portion inserted into one of the vertical sheet peg holes and with a portion protruding from the vertical sheet hole, the protruding portion sized to be insertable into the base sheet perforations, and
   the portion of the pegs protruding from the bottom edge of each of the vertical sheets being inserted into an equal plurality of the perforations in the base sheet, whereby each of said vertical sheets is joined to the base sheet in a vertical orientation relative to the horizontal base sheet.

2. The assembly of claim 1 further comprising a plurality of said vertical sheets with a plurality of said pegs partially inserted into the peg holes on the bottom edges of each of the vertical sheets, at least two of which vertical sheets are formed with top and bottom edges that are nearly the same length as the base sheet side edges and one of which vertical sheets is assembled and joined to the base sheet by insertion of the portion of said pegs protruding from the bottom edge of the vertical sheet into the base sheet perforations in the row of said perforations nearest to each one of the side edges of the base sheet.

3. The assembly of claim 2 further comprising at least one of said vertical sheets with top and bottom edges nearly the same length as the base sheet front edge and is fastened at a right angle to and between the two vertical sheets installed on the base sheet side edges.

4. The assembly of claim 3 further comprising at least one brace secured to the base sheet and to at least one of the vertical sheets at a joint between the vertical sheet and the base sheet.

5. The assembly of claim 4 wherein at least two of the vertical sheets are adjacent to each other and further comprising at least one brace secured to each of said two adjacent vertical sheets.

6. The assembly of claim 5 further comprising at least one brace secured to the base sheet and to two of the adjacent vertical sheets.

7. The assembly of claim 6 wherein each vertical sheet further comprises at least two grooves, one of the grooves formed adjacent to each side of the top edge of each vertical sheet, on each flat side surface of the vertical sheet separated from the top edge by a uniform distance and the assembly further comprising at least one brace secured to the top edges of two or more adjoining ones of the vertical sheets, the brace comprising a flat top section the same width as the vertical sheet top edge and comprising two parallel side members attached to the brace top section, each brace including a side member comprising an inward facing surface each of which inward facing brace side member surface is opposite from and facing another inward facing brace side member surface and comprises an inward projecting ridge formed on each inward facing brace side member surface, each ridge spaced from the brace top section the same distance as the separation of the vertical sheet grooves from the vertical sheet top edge such that the brace ridges are engageable in the vertical sheet side grooves.

8. The assembly of claim 2 wherein the assembly further comprises two of said vertical sheets fastened to the base sheet such that said two vertical sheets are parallel to each other and wherein each of said two vertical sheets further comprises a plurality of perforations regularly spaced in an array of rows and columns through the vertical sheet side surfaces, and further comprising at least one pole member with a peg at each end and means to reduce the length of the pole member to at least slightly less than the separation between said two parallel vertical sheets, and spring means to bias the pole member ends apart, and the pole member is attached between said two parallel vertical sheets by insertion each of the pole pegs into one of said perforations in each of said two parallel vertical sheets.

9. A method of securing items within a cargo bed having an essentially horizontal floor, the method comprising forming a flat, rectangular base sheet with perforations formed normal to the base sheet and in a regularly spaced array of rows and columns, the perforations in said array being uniformly spaced a predetermined distance within each row and uniformly spaced the same distance within each column, the base sheet sized to fit within the cargo bed on the floor thereof, installing the base sheet on the floor within the cargo bed, tying the base sheet to the cargo bed, forming at least one vertical sheet, being generally flat and rectangular with top and bottom parallel edges, and forming a plurality of peg holes in the bottom edge, the peg holes spaced the same distance apart as the separation of the base sheet perforations within each row and column, partially inserting into at least two of the vertical sheet bottom edge peg holes, a part of an equal number of round straight pegs, leaving a portion thereof protruding from the vertical sheet bottom edge, and attaching at the vertical sheet to the base sheet by inserting the protruding portion of each peg into one of the base sheet perforations.

10. The method of claim 9 further comprising forming the base sheet with one of two pair of parallel side edges of the rectangular base sheet being longer than another pair of parallel side edges and wherein at least two of the vertical sheets are formed with top and bottom edges about equal in length to the base sheet longer side edges, and installing one of said two vertical sheets at each longer side edge of the base sheet such that the two vertical sheets are parallel to each other and separated from each other by a width of the base sheet.

11. The method of claim 10 further comprising forming the base sheet to have two parallel side edges shorter than the base sheet longer side edges and forming at least one additional vertical sheet in addition to the two vertical sheets that are about equal in length to the base sheet longer side edges to be about the same length as one of the base sheet shorter side edges and further comprising fastening said additional vertical sheet at a right angle to and between the two vertical sheets that are about equal in length to the base sheet longer side edges.

12. The method of claim 11 further comprising securing at least one brace to the base sheet and to at least one of the vertical sheets.

13. The method of claim 9 further comprising securing at least one ring or hook to the base sheet and using said ring or hook to secure cargo items in the cargo bed.

14. The method of claim 10, wherein each of the vertical sheets further comprises two flat and parallel side surfaces, through which a plurality of regularly spaced perforations are formed, the method further comprising securing between the vertical sheets at least one telescoping pole having pegs extending from each end and being, shortenable to a first length of less than the separation of the two parallel vertical sheets and spring biased to a second longer length greater than the separation of the two parallel vertical sheets.

* * * * *

UNITED STATES PATENT AND TRADEMARK OFFICE
CERTIFICATE OF CORRECTION

PATENT NO. : 8,303,221 B2
APPLICATION NO. : 12/074793
DATED : November 6, 2012
INVENTOR(S) : Arthur W. Lenz, Jr.

Page 1 of 1

It is certified that error appears in the above-identified patent and that said Letters Patent is hereby corrected as shown below:

On the Title Page

Item (75) the name of the inventor is corrected by adding thereto the suffix: "Jr.". The corrected name of the inventor being: "Arthur W. Lenz, Jr."

Signed and Sealed this
Ninth Day of April, 2013

Teresa Stanek Rea
*Acting Director of the United States Patent and Trademark Office*